United States Patent [19]

Legostaev et al.

[11] 3,932,079

[45] Jan. 13, 1976

[54] PNEUMATIC TIRE VULCANIZING APPARATUS

[76] Inventors: Valery Leonidovich Legostaev; Oleg Eduardovich Nadzharov; Albert Vasilievich Fedorov; Ivan Ivanovich Kruglov, all of Tambov, U.S.S.R.

[22] Filed: Jan. 29, 1975

[21] Appl. No.: 545,316

[52] U.S. Cl. .................. 425/32; 425/34; 425/38
[51] Int. Cl.² .................. B29H 5/02; B29H 5/08
[58] Field of Search ............. 425/17, 18, 19, 20, 21, 425/22, 23, 24, 25, 28 R, 29, 30, 31, 32, 33, 34, 35, 36, 37, 38, 39, 40, 41, 42, 43

[56] References Cited
UNITED STATES PATENTS

| | | | |
|---|---|---|---|
| 3,309,737 | 3/1967 | MacMillan | 425/19 |
| 3,477,100 | 11/1969 | Pech et al. | 425/38 X |
| 3,550,196 | 12/1970 | Gaguit | 425/34 |

FOREIGN PATENTS OR APPLICATIONS

| | | | |
|---|---|---|---|
| 802,014 | 9/1958 | United Kingdom | 425/38 |
| 1,472,158 | 1/1967 | France | 425/32 |

*Primary Examiner*—J. Howard Flint, Jr.
*Attorney, Agent, or Firm*—Haseltine, Lake & Waters

[57] ABSTRACT

The pneumatic tire vulcanizing apparatus includes a series of vulcanizing presses arranged in a row, the presses including mold assemblies each having a top mold section and a bottom mold section, and a manipulator for reloading of the molds. The manipulator includes a frame associated with drive means for moving the frame along the row of the presses, the frame supporting thereon a mold opening mechanism including a cross beam provided with clamping means adapted to engage the top mold sections, as well as a mechanism for loading green tires into bottom mold sections, associated with a carriage supporting green tire holders. The cross beam is associated with a drive means for moving the cross beam in a vertical direction and in a direction transverse of the row of the presses, the cross beam carrying followers adapted for cooperation with vertical grooves in the side jaws mounted on the carriages, whereby the cross beam is vertically movable relative to the carriage and independently therefrom, the carriage moving jointly with the cross beam, as the latter moves transversely of the row of the presses.

1 Claim, 9 Drawing Figures

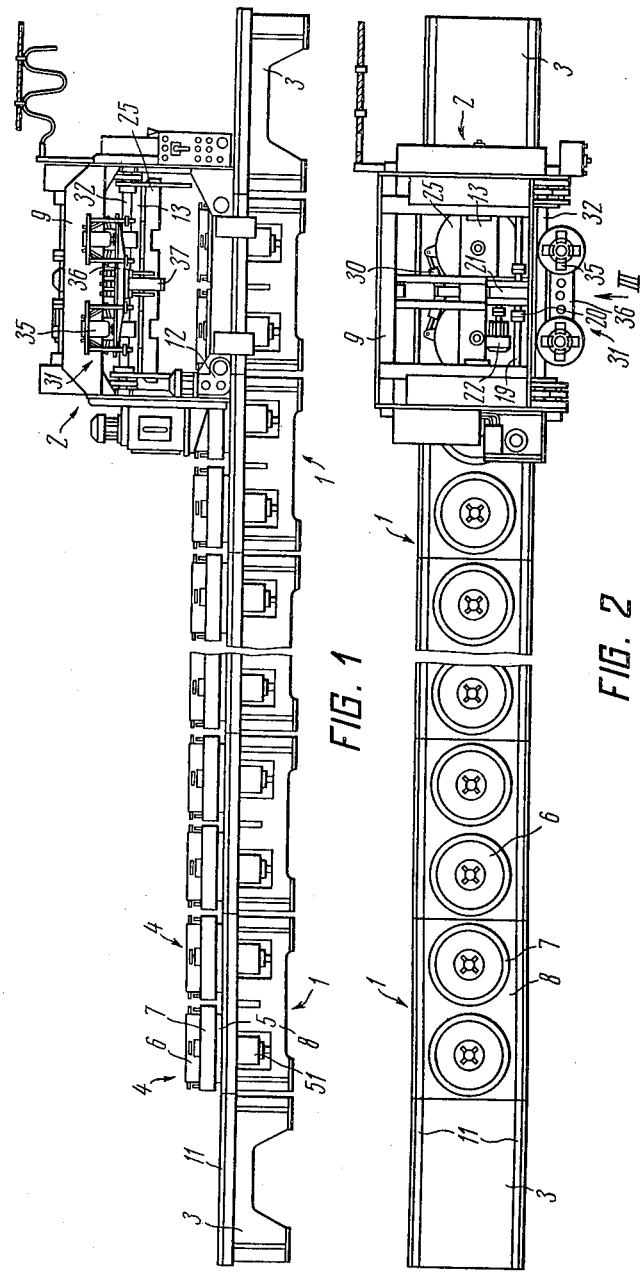

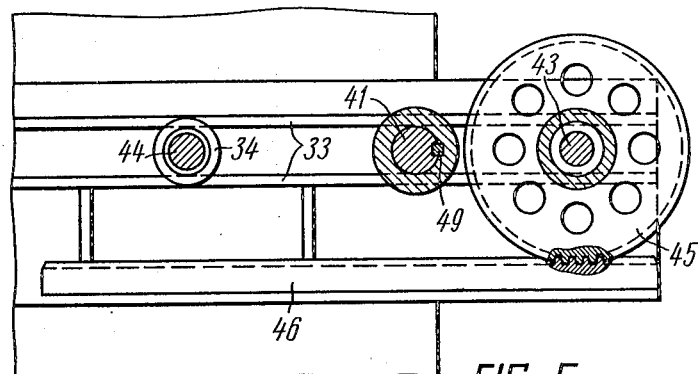
FIG. 5
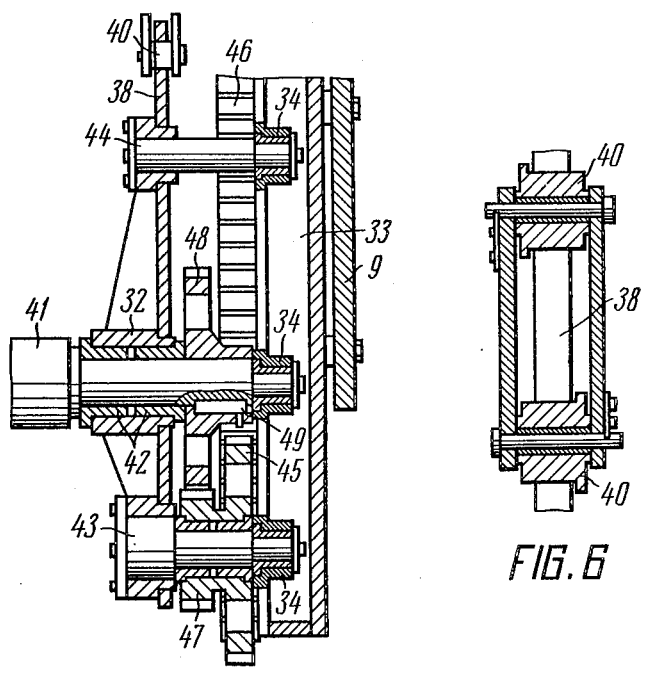
FIG. 7
FIG. 6

PNEUMATIC TIRE VULCANIZING APPARATUS

The present invention relates to production of pneumatic tires and, more particularly, it relates to pneumatic tire vulcanizing apparatus.

There is already known a pneumatic tire vulcanizing apparatus including a series of vulcanizing presses arranged in a row and a manipulator movable along the row of the presses.

Each of the vulcanizing presses of the known apparatus includes a mold assembly made up by the bottom and top mold sections lockable for a tire curing period with a locking device, as well as a bladder assembly.

The manipulator or crane for reloading the molds of each press includes a frame associated with a drive adapted to move the frame along the row of the presses, the frame having mounted thereon a mold opening mechanism and a mechanism for loading uncured or green tires into the bottom mold sections. The frame also supports thereon a mechanism for unloading of cured tires. The mold opening mechanism includes a cross beam movable on the frame transversely of the row of the presses and carrying clamps associated with independent actuators for effecting vertical reciprocation of the top mold sections.

The mechanism for loading green tires into the bottom mold section includes a carriage movable transversely of the row of the process and supporting a green tire holder associated with an independent actuator for effecting vertical reciprocation of the holder. The said carriage of the mechanism for loading green tires into the bottom mold section and the cross beam of the mold opening mechanism are interconnected to move as an integral structure transversely of the row of the presses under the action of the independent drive means. Therefore, the said known apparatus has three independent drive means, viz. one for vertical reciprocation of the top mold sections, the second one for vertical travel of the green tires and the third one for simultaneous travel of the top mold sections and green tires transversely of the row of the presses.

The incorporation of two individual drives for vertical and transverse, relative to the row of the presses, travel of the top mold section is a considerable drawback of the known tire vulcanizing apparatus, complicating as it does the structure of the apparatus itself and the system of its automatic control.

It is an object of the present invention to create a structure of a tire vulcanizing apparatus, which should be more simple and less complicated to control and which should offer increased reliability and improved economy.

This object is attained in an apparatus for vulcanizing penumatic tires, comprising a series of vulcanizing presses arranged in a row and having molds including each a top section and a bottom section and a manipulator for reloading of the molds, including a frame mounted for motion longitudinally of the row of the presses and associated with a drive for moving the frame in this direction, the frame having mounted thereon a mold opening mechanism including a cross beam movable in a transverse direction with respect to the row of the presses and having clamps for raising and lowering the top mold sections, and a mechanism for loading green tires into the bottom mold sections, including a carriage movable transversely of the row of the presses and having mounted thereon a green tire holder associated with a drive for effecting vertical reciprocation of this holder, in which apparatus, in accordance with the invention, the cross beam is provided with drive means for effecting the motion thereof in a vertical direction and in a direction transverse of the row of the presses, the carriage of the tire loading mechanism having two side jaws having made therein closed-end vertical grooves, each such groove receiving therein at least two followers mounted on the cross beam of the mold opening mechanism, whereby there is effected movement of said cross beam independently of said carriage in vertical direction and movement of said carriage together with said cross beam upon movement of the latter in a direction transverse of the row of the presses.

The herein disclosed apparatus offers a simple structure simplifying the control of the apparatus and, hence, enabling to have fewer control and automation means.

The present invention will be further described in connection with an embodiment thereof, with reference being has to the accompanying set of drawings, wherein:

FIG. 1 is a general view of a pneumatic tire vulcanizing apparatus in accordance with the invention;

FIG. 2 is a plan view of the apparatus shown in FIG. 1;

FIG. 5 is a sectional view taken on line V—V in FIG. 3;

FIG. 6 is a sectional view taken on line VI—VI in FIG. 4;

FIG. 7 is a sectional view taken on line VII—VII in FIG. 3;

Figure 3:
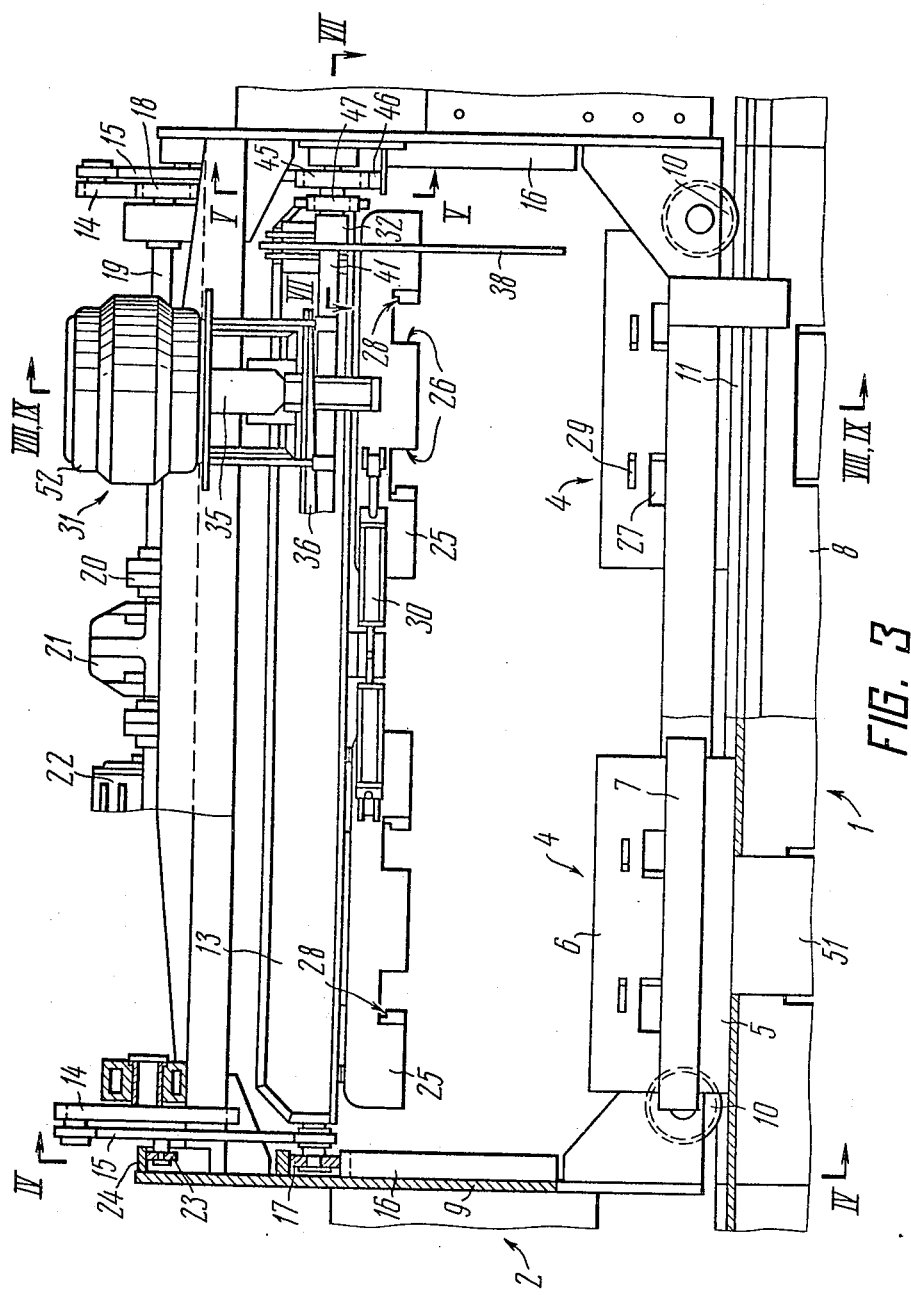
FIG. 3 is a view taken along arrow line III in FIG. 2.

Referring now in particular to the appended drawings, the pneumatic tire vulcanizing apparatus comprises a series of vulcanizing or curing presses 1 (FIGS. 1 and 2) arranged in a longitudinal row, a manipulator 2 movable along the row of the presses 1 and end table 3 for performing maintenance and repairs of the manipulator.

Each vulcanizing press 1 includes a mold 4 (FIG. 1) made up by a bottom section 5 and a top section 6 lockable together for a curing period with a bayonet lock. In the herein described embodiment each press 1 has two molds 5 supported by a single table 8.

The manipulator 2 comprises a frame 9 with wheels 10 (FIG. 3) supporting the frame 9 on tracks 11 running along the respective tables 8 of every press 1, the frame 9 being movable along these tracks 11 by a drive including motor-reducer combinations 12 (FIG. 1) associated with the front wheels 10 (FIG. 3).

The frame 9 carries a mold opening mechanism including a cross beam 13 which is reciprocable both vertically and transversely of the row of the presses 1 by means of a drive including two crank mechanisms arranged at the lateral sides of the frame 9, each mechanism including a crank wheel 14 and a connecting rod 15.

The cross beam is reciprocable in L-shaped guideways 16 (FIGS. 3 and 4) mounted on the lateral side walls of the frame 9, for which purpose the frame 9 is provided with wheels 17 (FIG. 3).

The crank wheels 14 are rotatable from gears 18 mounted on shafts 19 coupled through respective clutches 20 with a reducer 21 of which the input shaft is connected with an electric motor 22.

Each connecting rod 15 is provided with a follower 23 positioned to (FIGS. 3 and 4) engage a cam guide 24 in the lateral side wall of the frame 9, as the wheels 17 (FIG. 3) roll from the vertical leg or portion of the L-shaped guide-ways 16 onto the horizontal leg or portion thereof and vice versa.

The cross beam 13 is provided with clamps for lifting and lowering the top mold sections 6, the clamps being in the form of wrenches 25 mounted on the cross beam 13. Each wrench 25 has slots 27 adapted to receive therein, as the wrench 25 is lowered onto the top mold section 6, abutments 27 of the bayonet lock 7, the wrench 25 further having projections 28 which become positioned directly under the lifting shoulders 29 of the top mold sections 6, following rotation of the wrench 25 for opening of the bayonet lock 7 of the respective mold 4.

The mold 4 is thus being opened by the top section 6 thereof bearing by its shoulders 29 upon the projections 28, in which manner the cross beam 13 lifts off the top mold section 6. Rotation of the wrenches 25 is effected by respective hydraulic cylinders 30. The frame 9 further supports a mechanism 31 for loading uncured or green tires into the bottom mold sections 5 of the presses 1.

The mechanism includes a carriage 32 reciprocable in horizontal guideways 33 (FIGS. 4 and 5) of the frame 9 on wheels 34.

The carriage 32 (FIG. 1) has mounted thereon a pair of side jaws 38 (FIG. 4) in which there are made closed-end vertical grooves 39.

Each groove 39 receives therein two followers 40 (FIGS. 4 and 6) carried by the cross beam 13 (FIG. 4) of the mold opening mechanism.

This structure of the tire vulcanizing apparatus enables to effect separate vertical motion of the top mold sections 6, as well as joint motion of these mold sections 6 with the green tire loading mechanism 31 in a direction transverse of the row of the vulcanizing presses 1 under the action of a single drive, which simplifies the structure of the apparatus and its control and enables to save control and automation means.

Furthermore, in accordance with the present invention, the connection between the cross beam 13 of the mold opening mechanism and the carriage of the green tire loading mechanism 31 by means of closed-end vertical grooves 39 made in the respective jaws 38 of the carriage and two followers 40 received in each groove 39 and belonging to the cross beam 13 precludes highly unwanted rotation of the cross beam 13 about the axis of the wheels 17 (FIG. 3) as the cross beam 13 is moving along the L-shaped guideways 16 of the frame 9, whereby more accurate alignment of the wrenches 25 with the top mold sections is provided for.

The carriage 32 of the mechanism 31 for loading green tires into the bottom mold sections 5 of the presses 1 includes a tubular beam 41 (FIG. 7) journalled means of bronze bushings 42 in the jaws 38 of the carriage 32.

The tubular beam 41 has mounted thereon a support 36 (FIG. 3) for the holders 35, the support 36 being reciprocable along the tubular beam 41 by the action of the drive 37 (FIG. 1).

The wheels 34 (FIG. 7) of the carriage 32 are mounted on the end portions of the tubular beam 41 and also about axles 43 and 44 supported by the respective jaws 38 of the carriage 32.

The axle 43 carries thereon a twin gear of which the greater gear 45 meshes with a stationary toothed rack 46 mounted on the side wall of the frame 9, while the smaller gear 47 meshes with a pinion 48 keyed by means of a key 49 to the end of the tubular beam 41.

Figure 8:
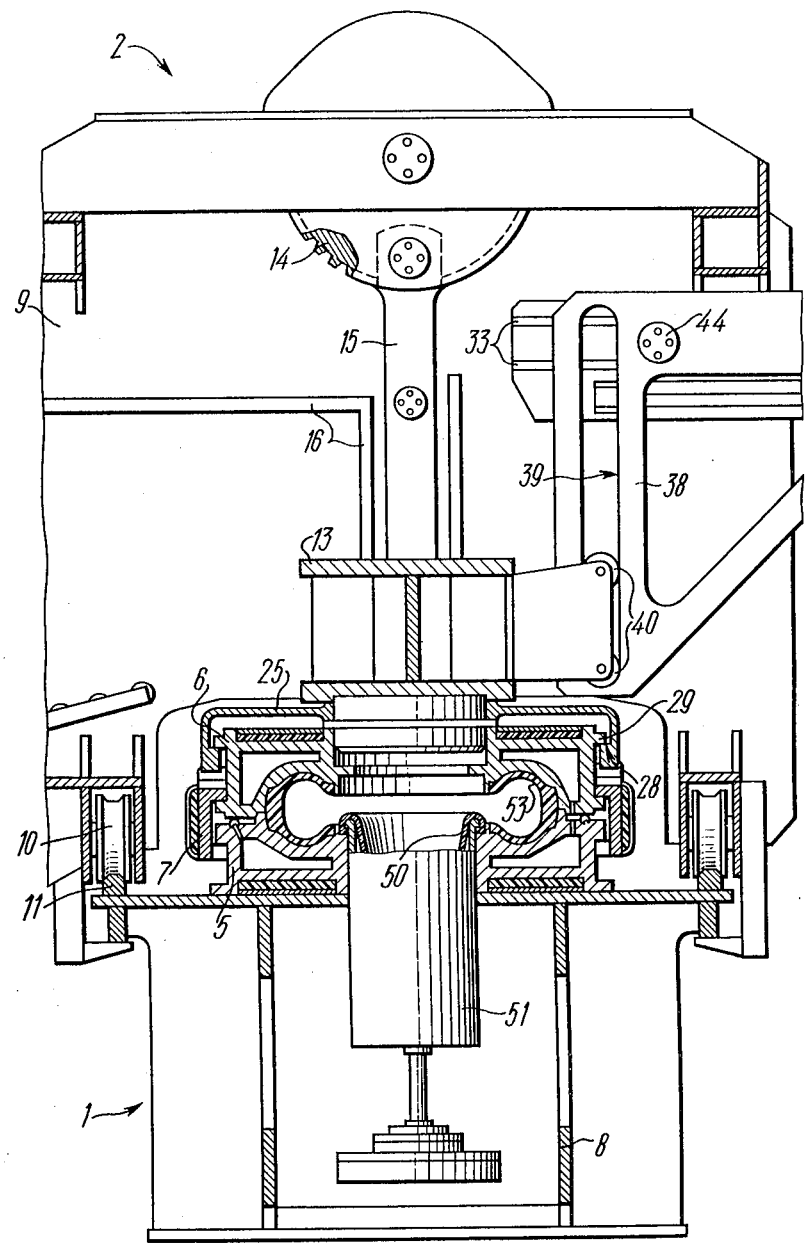
FIG. 8 is a sectional view taken on line VIII—VIII in FIG. 3, with the cross beam in the lowermost position.
Figure 9:
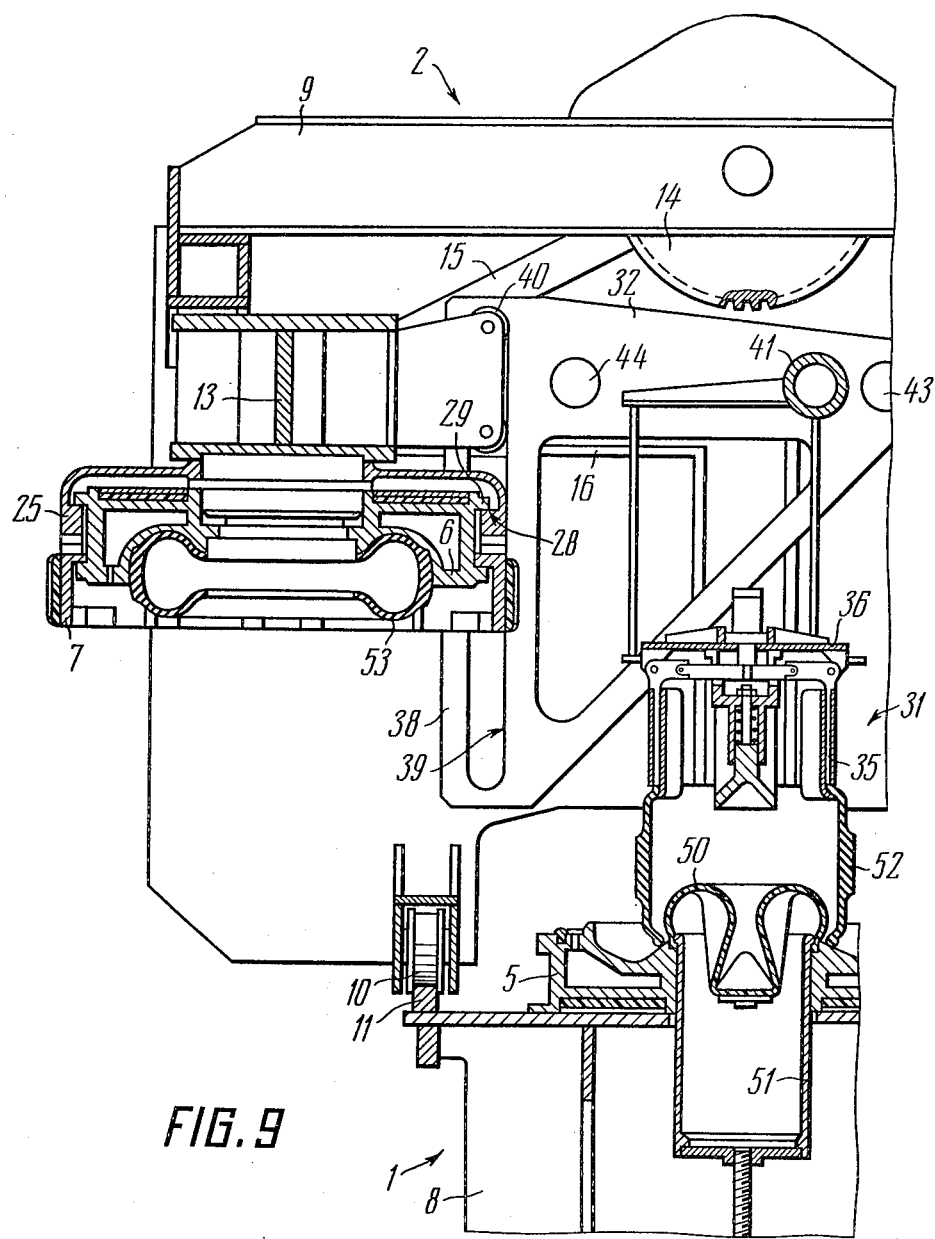
FIG. 9 is a sectional view on line IX—IX in FIG. 3, with the cross beam retracted transversely of the row of the presses.

The above structure of the mechanism 31 (FIG. 3) for loading green tires into the bottom mold sections 5 of the presses 1 enables to employ the transverse motion of the cross beam 13 (FIGS. 8 and 9) and of the mechanism 31 (FIG. 9) relative to the row of the presses 1 to rotate the green tire holders 35 and to align the axes of these holders 35 with those of the bottom mold sections 5. In this way the overall structure of the pneumatic tire vulcanizing apparatus becomes simplified still further on account of the apparatus having less drive means. Each bottom mold section 5 mounted on the table 8 of the press 1 includes a bladder assembly including a bladder 50 and a well 51 into which the bladder 50 is withdrawn when the press 1 is open.

The herein disclosed apparatus for vulcanizing pneumatic tires operates, as follows.

The manipulator 2 (FIGS. 3 and 4) is positioned over the molds 4 of the first-in-succession curing press 1, the wrenches 25 being axially aligned with these molds 4. At this moment the tire curing process has been already completed within the said molds 4.

The holders 35 of the mechanism 31 are facing upwardly and support uncured or green tires 52. The cross beam 13 with the wrenches 25 is in its raised or topmost position at the vertical leg or portion of the L-shaped guideways 16 of the frame 9.

Then the crank mechanisms are operated to drive the cross beam 13 with the wrenches 25 downwardly, the followers 40 of the cross beam rolling in the closed vertical grooves 39 of the jaws 38 of the loading mechanism 31, which precludes rotation of the cross beam 13 in a vertical plane relative to the axis of the wheels 17 of the cross beam 13, whereby the wrenches 25 engage the top mold sections 6 in the precisely predetermined position.

Upon having contacted the top mold sections 6 the cross beam 13 is arrested, and the wrenches 25 are rotated by the hydraulic cylinders 30, thus opening the bayonet locks 7 of the molds 4 and engaging the top molds 6 by the projections 28. At the same time the respective bladder 50 is removed from each one of the two cured tires and forced out into the respective one of the wells 51.

This done, the cross beam 13 is raised as far as the entrance of the horizontal portion or leg of the L-shaped guide-ways 16, the cross beam 13 raising therewith the wrenches 25 and the top mold sections 6 with the cured tires 53, whereafter the cross beam 13 travels along this horizontal portion of the L-shaped guideways 16 in a direction transverse with respect to the row of the presses 1.

The cross beam 13 starts pulling therealong the green tire loading mechanism 31 by the followers 40 received in the closed-end grooves 39 in the jaws 38 of the mechanism 31. At this stage of the cycle the cross beam 13 and the mechanism 31 constitute an integral rigid system driven by the crank mechanisms along the horizontal portion of the L-shaped guide-ways 16 and along the horizontal guideways 33, respectively, on wheels 17 and 34. Thus, the cross beam 13 is likewise unable during this stage to rotate about the longitudinal axis of the wheels 17.

Simultaneously with the above described retraction of the cross beam 13 there is effected rotation of the holders 35 carrying green tires 52, owing to interaction between the gear 45 (FIG. 3) and the stationary toothed rack 46 of the frame 9.

When the cross beam 13 (FIG. 9) has been retracted, the cured tires 53 are unloaded from the top molds 6 by means of a known per se unloading mechanism (not shown), while the support 36 of the green tire loading mechanism 31 and the holders 35 are driven by the drive 37 (FIG. 1) downwardly to place the green tires 52 (FIG. 9) into the respective bottom mold sections 5. Thereafter the curing steam is fed under pressure into the wells 51, whereby the bladders 50 enter the green tires 52. This done, the holders 35 release the green tires 52, and the support 36 of the loading mechanism 31 is raised.

Figure 4:
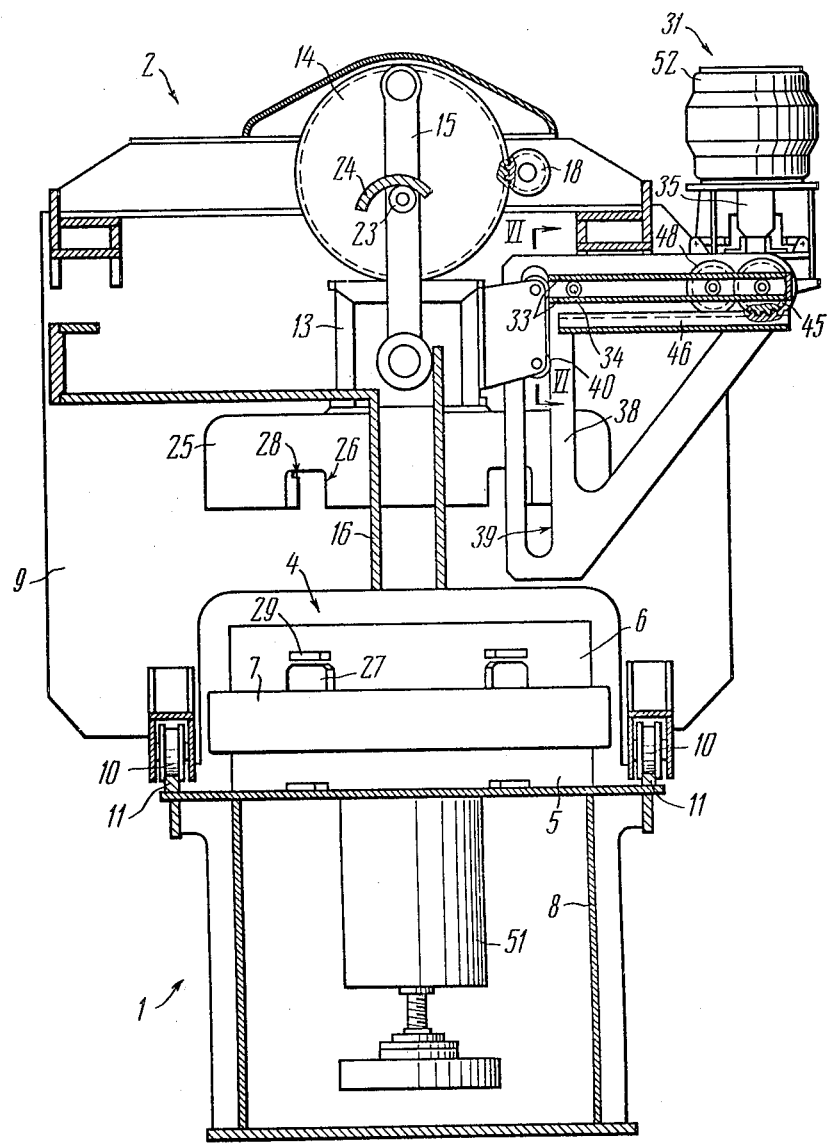
FIG. 4 is a sectional view taken on line IV—IV in FIG. 3.

Thereafter the cross beam 31 is driven toward the vertical portion or leg of the L-shaped guideways 16, returning the green tire loading mechanism 31 into the initial position thereof (see FIG. 4). Then the cross beam 13 is lowered along the vertical portion or leg of the L-shaped guideways 16 (FIG. 8), the followers 40 rolling along the closed-end vertical grooves 39 of the now stationary jaws 38 of the loading mechanism 31 and thus precluding rotation of the cross beam 13 about the longitudinal axis of the wheels 17 thereof.

The top mold sections 6 settle upon the green tires held in the bottom mold sections 5, and simultaneously pressurized steam is fed into the bladders 50. At the end of the downward stroke of the cross beam 13 the mold sections 5 and 6 close upon each other, and the cross beam 13 is arrested. The wrenches 25 are operated to lack the bayonet locks 7 of the molds 4, whereafter the cross beam 13 is raised into its initial position (FIG. 4).

The process of curing the green tires begins in the molds mentioned hereinabove, whereas the manipulator 2 (FIG. 1) is driven toward the next-in-succession curing press 1 in the molds 4 of which the curing process has just been completed, and the above described cycle of unloading-loading the molds 4 of this press 1 is repeated. As the manipulator 2 performes servicing of the respective molds 4 of all the successive curing presses 1 in the row, the curing process ends in the molds 4 of the first-in-succession press 1 in the row. The manipulator 2 is driven to overlie this first-in-succession curing press 1, and the entire cycle of operation of the herein disclosed tire vulcanizing apparatus repeates itself.

What we claim is:

1. Pneumatic tire vulcanizing apparatus comprising a series of tire curing presses arranged in a longitudinal row; mold assemblies of said presses, each including a top mold section and a bottom mold section; manipulator for reloading said mold assemblies; the frame of said manipulator, mounted for motion longitudinally of said row of said presses; drive means for effecting motion of said frame in the longitudinal direction; a mold opening mechanism mounted on said frame; the cross beam of said mold opening mechanism; drive means for effecting motion of said cross beam vertically and transversely of said row of said presses; clamp means for clamping said top mold sections, mounted on said cross beam; mechanism for loading green tires into said bottom mold sections, mounted on said frame; the carriage of said tire loading mechanism, movable in a direction transverse of said row of said presses; a green tire holder mounted on said carriage; drive means for reciprocating said green tire holder vertically; two side jaws mounted on said carriage, each having a closed-end vertical groove; follower means mounted on said cross beam for cooperation with said vertical grooves, whereby there is provided independent motion of said cross beam with respect to said carriage in a vertical direction and joint motion of said carriage and said cross beam, as the latter is driven in a direction transverse of said row of said presses.

* * * * *